United States Patent Office 3,236,400
Patented Feb. 22, 1966

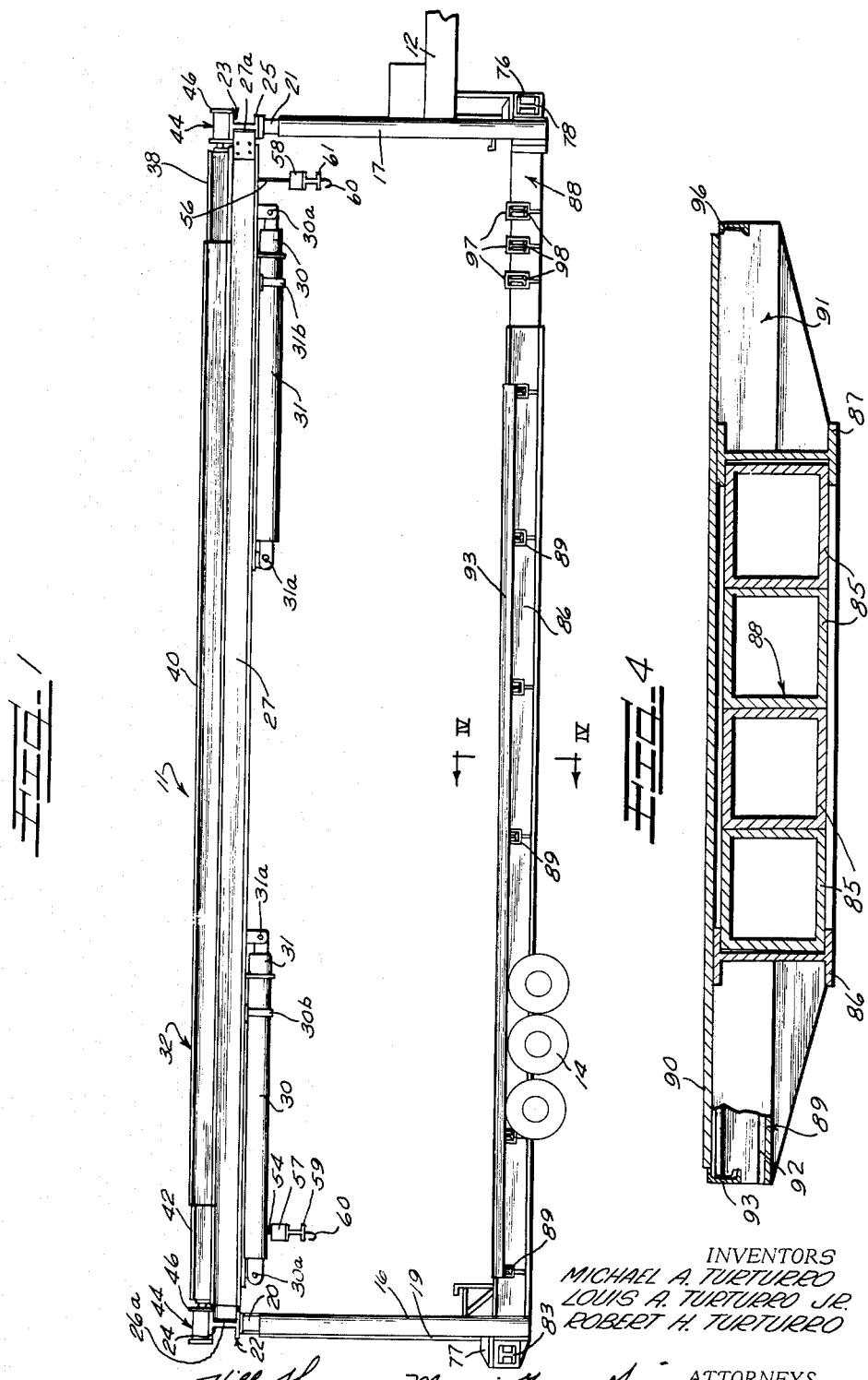

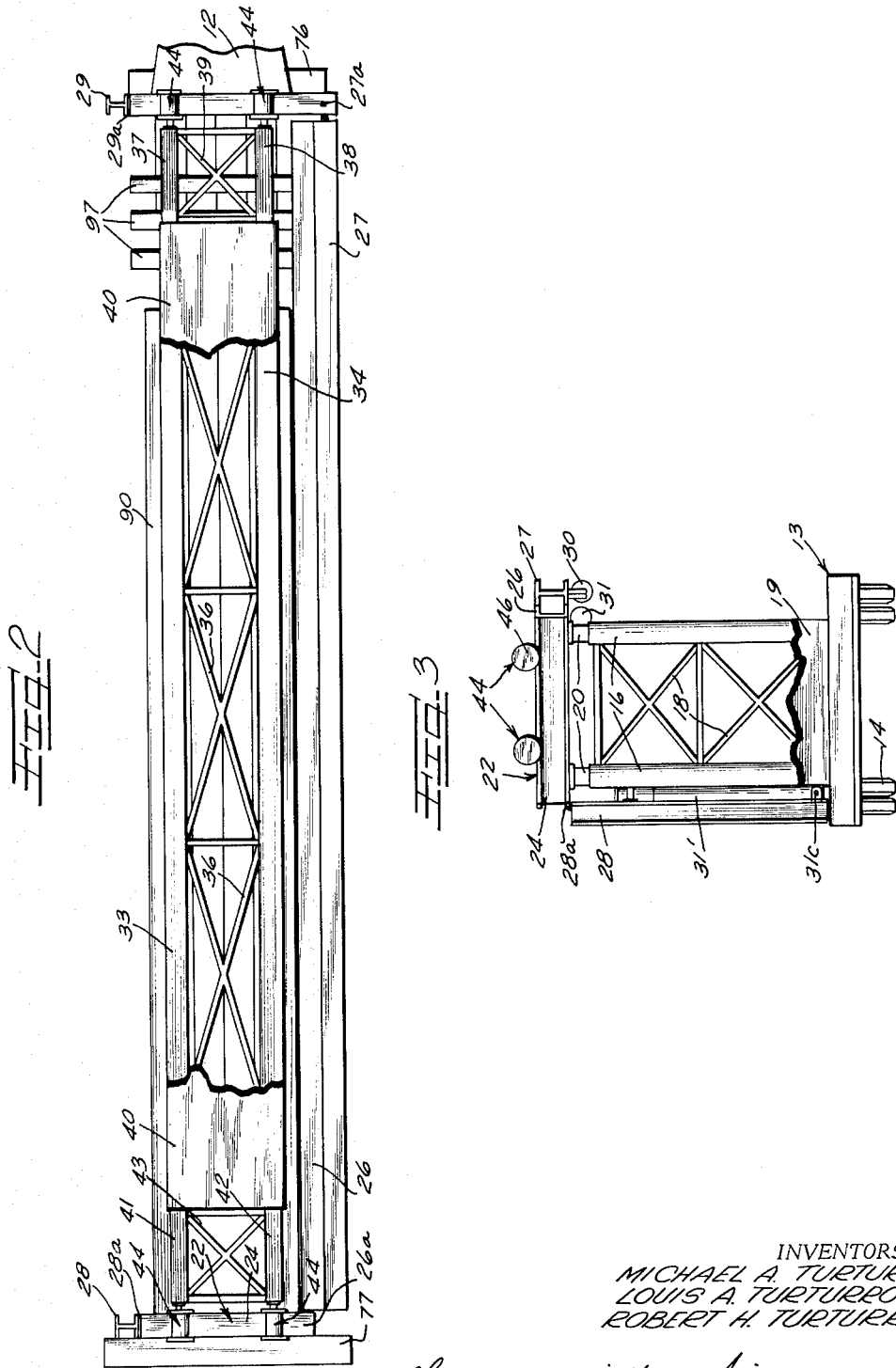

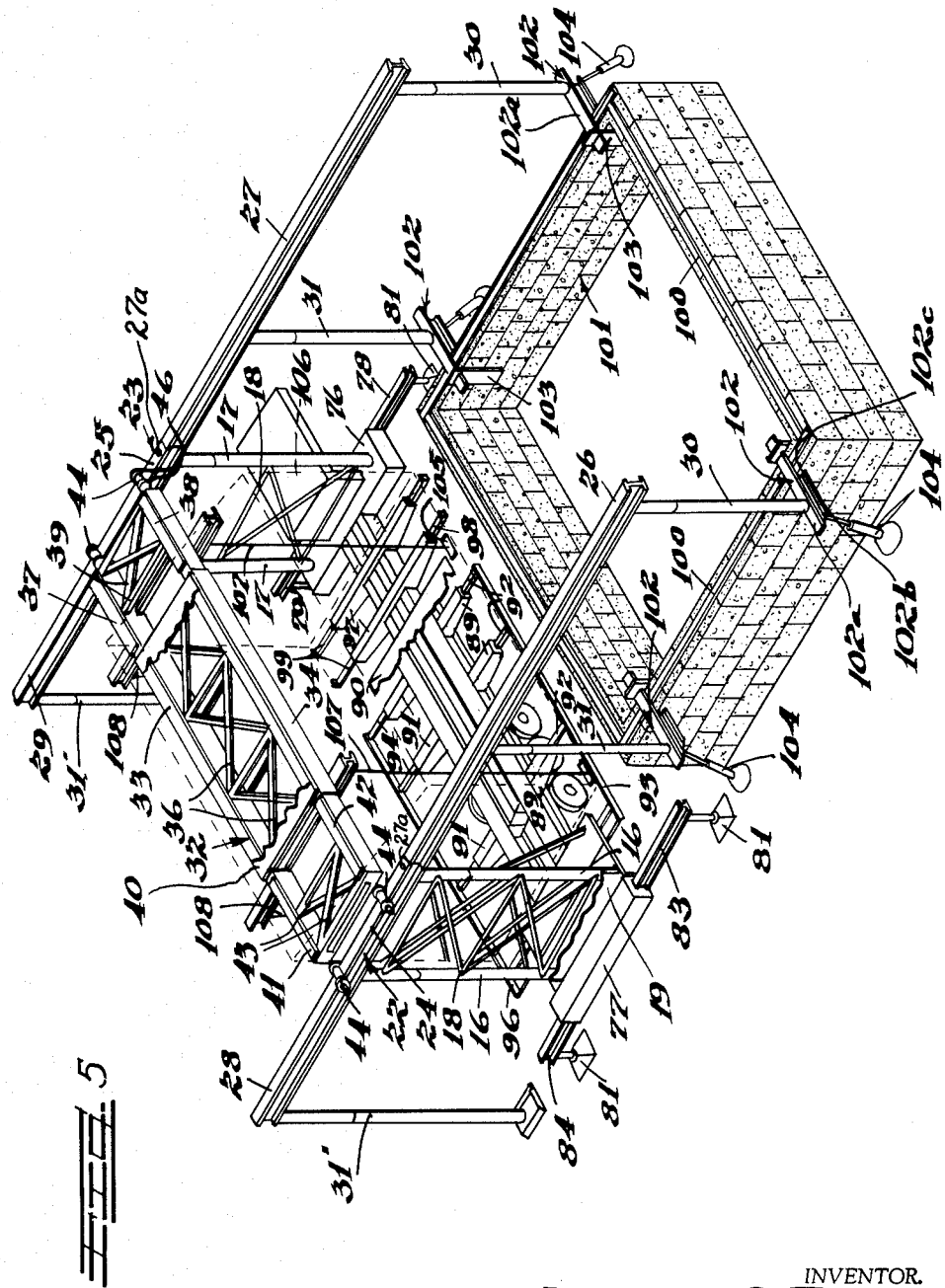

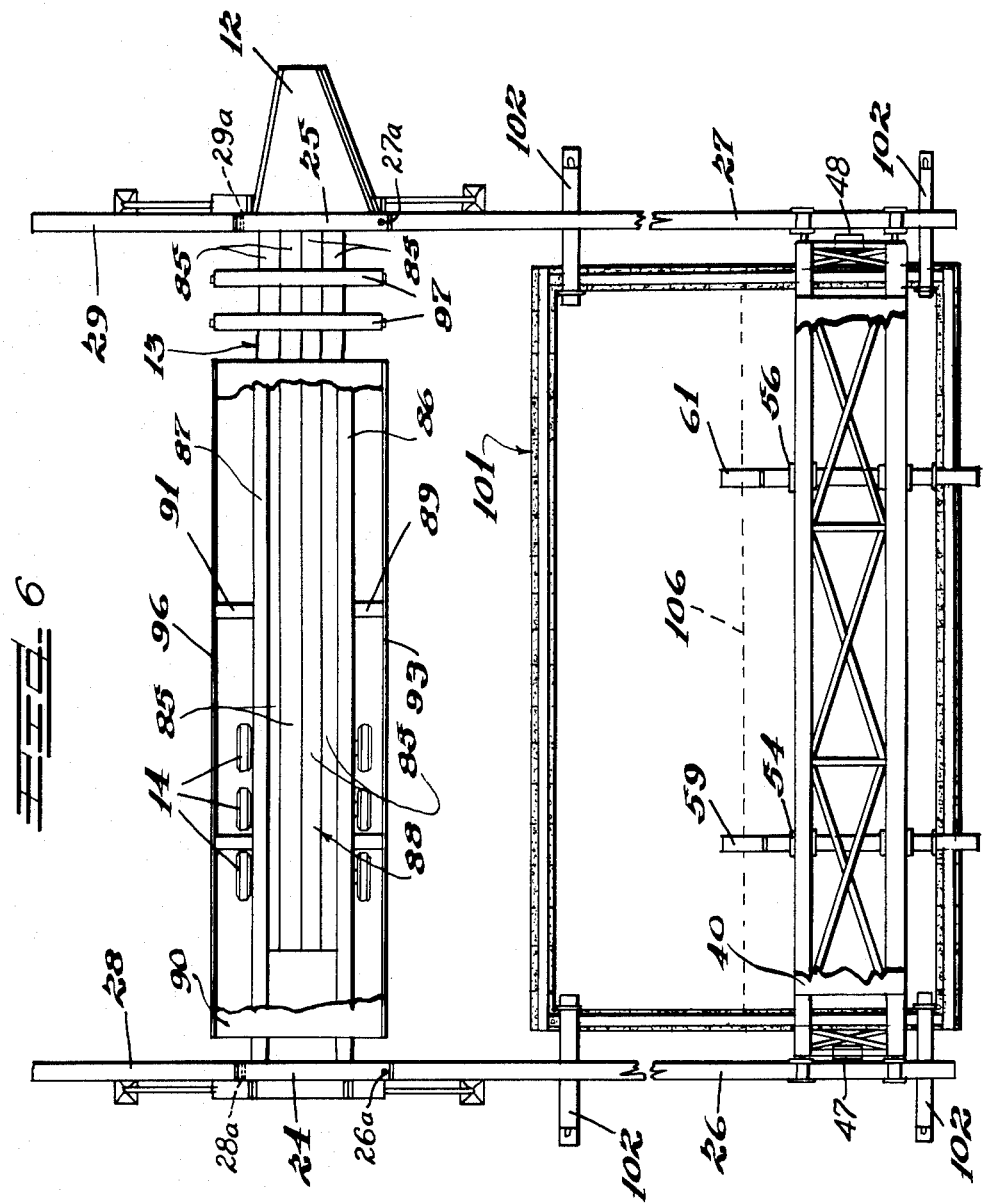

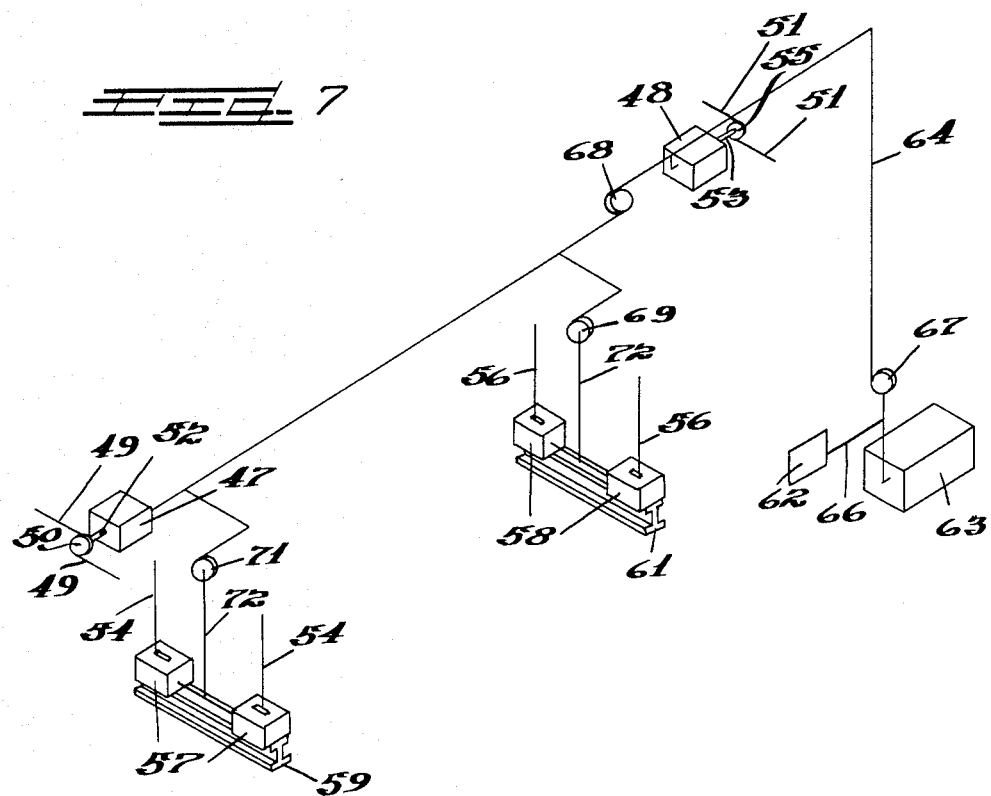

1

3,236,400
HOUSE LOADING TRAILER
Michael A. Turturro, Louis A. Turturro, Jr., and Robert H. Turturro, all of 30 Kendall St., Worcester, Mass.
Filed May 27, 1963, Ser. No. 283,170
14 Claims. (Cl. 214—75)

The present invention is generally concerned with a house trailer and is more specifically directed to a house trailer for transporting and unloading preconstructed sectional house units.

The housing industry has now gone through the phase of building better and less expensive houses by utilizing preconstructed house sectional units. A preconstructed house unit is manufactured with complete wiring, plumbing and other equipment and is preferably manufactured indoors at a factory site. The preconstructed house units are then transported to a house foundation which has been previously constructed. There they are unitized to form a completed sectional house. The present invention is concerned with a trailer that can transport the preconstructed house units from the factory to the house foundation and especially a trailer that will unload the preconstructed house units on the house foundation.

Presently, preconstruction house units are transported from the factory to the building site by ordinary low bed trailers. The house units are loaded onto the low bed trailers at the factory site by boom cranes and similar loading means. When the low bed trailer arrives at the factory site another crane or similar means is used to unload the preconstructed house unit onto the house foundation that has been erected at the building site. Other methods of unloading the house unit, such as rolling the house unit from the low bed trailer onto the house foundation, have also been attempted.

However, the above means for unloading house units onto the house foundation are inadequate in many respects. One of the major disadvantages is that they are extremely time consuming and expensive. Further, rolling the house unit onto a house foundation causes stresses that put undue strain on the house unit supports. Thus, the finished walls in the house unit crack and requires extensive repairs before the sectional house can be made livable.

The boom crane unloader has many detriments. It requires an extremely experienced operator to position the house unit onto the house foundation; a number of men correctly align the house unit on the house foundation; where there is only one house being erected at a remote site, the boom crane is completely inadequate and inefficient because it is necessary not only to have the boom crane but also two additional low bed trailers for each house unit of a two sectional house; and the length of the boom requires a special permit in order to transport the slow moving boom crane over the highways.

Therefore, it is an object of the present invention to provide a house unit trailer that will unload preconstructed house units onto a house foundation in an improved manner.

It is further another object of the present invention to provide a house unit trailer that can both transport and unload preconstructed house units.

It is still another object of the present invention to provide a house unit trailer which will unload preconstructed house units from a trailer bed and onto a house foundation with a minimum amount of effort.

It is still further another object of the present invention

2 to provide a house unit trailer which may be situated along side a house foundation and spaced therefrom and unload a preconstructed house unit over the side thereof and onto the house foundation.

It is still another object of the present invention to provide a trailer having a preconstructed house unit transport means thereon, a preconstructed house unit raising means thereon, and a preconstructed house unit transverse moving means thereon that moves the house unit off the side of the trailer onto an adjacent house foundation.

It is still another object of the present invention to provide a house unit trailer having transport means thereon, raising means thereon, a pair of collapsible guide rail means thereon, a means to lift the house unit off the transport foundation of the house trailer, a means to transversely move the preconstructed house unit over the side of the house trailer guided by the guide rails to position the house unit over a house foundation, and means to lower the house unit onto the house foundation.

Other objects and advantages of the invention will become more apparent during the course of the following description, particularly when taken in conjunction with the accompanying drawings in which like numerals designate like parts throughout the same.

On the drawings:

FIGURE 1 is a partial side view of a trailer constructed in accordance with the principles of the present invention.

FIGURE 2 is a top view of the trailer illustrated in FIGURE 1.

FIGURE 3 is an end view of the trailer illustrated in FIGURE 1.

FIGURE 4 is a transverse cross sectional view with parts in elevation taken along line IV—IV of FIGURE 1.

FIGURE 5 is a perspective view of a house unit trailer of the present invention positioned adjacent a house foundation in unloading position.

FIGURE 6 is a top plan view of the house trailer of the present invention illustrated in FIGURE 5; and FIGURE 7 is a schematic diagram illustrating electrical cable connections to the lift means and transverse moving means of the house unit trailer of the present invention.

As shown on the drawings:

The improved house unit trailer of the present invention transports and unloads preconstructed house units with relative ease to make the erection of a sectional house feasible in a matter of hours. The house unit trailer is of such a size and weight that the trailer is well adapted for use on the highways. The trailer is preferably constructed of lightweight heavy duty metal.

The trailer of the present invention has a trailer bed that has an extendible length and width to accommodate various sized house units. Connected to the trailer bed, on each end thereof, are a pair of hydraulically operated lifts. Each pair of hydraulic lifts have connected to their top end a collapsible guide rail. Each rail has a collapsible front portion and a collapsible back portion with the front portion being collapsible in a plane substantially parallel to the trailer bed and the back portion being collapsible in a plane substantially perpendicular to the trailer bed. Connected to the front portion of each rail is a pair of spaced collapsible hydraulic support jacks and connected to the end of the back portion of each rail is a collapsible hydraulic support jack.

An extendible carriage extends over the trailer bed and parallel thereto. Each end of the carriage is mounted to one of the guide rails by means that guide the carriage along the rails and means to actuate the carriage along the rails. The carriage has connected thereto a pair of spreader bars which are raised and lowered by lifts operatively mounted thereon. The spreader bars are aligned with and connected to lift rods that are in turn connected to the preconstructed house unit. The house unit sits on the trailer bed during the transportation thereof and is raised off the trailer by the actuation of the spreader bar lifts along with a preraising of the hydraulic lifts to a predetermined height.

Referring to FIGURES 1, 2 and 3 there is illustrated a preconstructed house unit wheel mounted trailer 11 of the present invention. The trailer 11 has a gooseneck or hitch 12 at the forward end thereof, for suitably connecting the trailer to a truck cab or tractor; and a trailer bed 13 having suitable rear axles and rear wheels 14.

The trailer bed has connected to its rear end a pair of spaced upwardly extending hydraulic lifts 16 and to its front end a pair of spaced upwardly extending hydraulic lifts 17. The hydraulic lifts are mounted substantially near the corners of the trailer bed. Both the rear and front pair of hydraulic lifts 16 and 17 have cross-structural supports 18 which lend structural strength and support to the hydraulic lifts.

Each pair of hydraulic lifts 16 and 17 have the portion thereof facing outwardly from the trailer bed, covered with a sheet 19 of light metal such as aluminum. The sheet 19 allows the truck to have the appearance of an enclosed trailer. It is of course understood that each pair of hydraulic lifts may be entirely covered if desired.

Rear hydraulic lifts 16 have pistons 20 that are raised and lowered therein and front hydraulic lifts 17 have pistons 21 that are raised and lowered therein. Connected across the tops of the pistons 20, is a rear I-guide rail track 22 and connected across the tops of the piston 21 is a front I-guide rail track 23.

The guide tracks 22 and 23 have respective central stationary portions 24 and 25 that are connected to tops of their respective hydraulic lift pistons; respective pivotal forward unloading arm portions 26 and 27 pivotally mounted by suitable pivot means 26a and 27a to one end of the stationary portion and used to guide the house unit over the house foundation; and respective pivotal back loading arm portions 28 and 29 (FIGURES 3 and 4) pivotally mounted by suitable pivot means 28a and 29a to the other end of the stationary portion and used to guide the house unit onto the trailer.

The forward track arms pivot in a plane substantially parallel to the trailer bed and the back track arms pivot downwardly towards the trailer bed substantially in the plane of their respective hydraulic lifts. Pivotally connected to each forward arm 26 and 27 are a pair of hydraulic support jacks 30 and 31. The hydraulic support jacks 30 are pivotally mounted at 30a to the underside of the front ends of the forward arms 26 and 27 (FIGURE 3) so that they may be pivoted upwardly, towards the trailer bed, to the underside of its respective extension arm. Likewise, the hydraulic support jacks 31 are pivotally mounted at 31a to the underside of the forward arm between the jack 30 and the stationary track portion. The hydraulic support jacks 30 and 31 are mounted on the underside of the forward arms by suitable U-clamp means 30b and 31b or any other suitable clamping means. Also, the back arms 28 and 29 have pivotally mounted at 31c to their undersides hydraulic support jacks 31′ that are used to support the arms in a position substantially parallel to the trailer bed when said arms are extended.

Across the top of the trailer extends a telescopic carriage 32. The telescopic carriage has a central pair of spaced longitudinally extending parallel arms 33 and 34 interconnected by a plurality of cross structural supports 36. Connected to the front end of the central carriage arms 33 and 34 and telescopically mounted therein are front extension carriage arms 37 and 38 respectively. The front extension arms are interconnected by cross supports 39. Likewise, telescopically mounted to the rear end of the central carriage arms 33 and 34 are rear extension carriage arms 41 and 42 respectively interconnected by cross supports 43. The rear carriage arms 41 and 42 are mounted so that they retract within their respective central arms 33 and 34.

The carriage has a top sheet covering 40 of light weight metal to give the entire trailer a closed trailer appearance and to aid in preventing contaminants from contacting the actuation means and wiring connected to the carriage.

Mounted to the ends of the rear and front carriage extension arms 37, 38, 41 and 42 are carriage rollers 44. The rollers 44 have suitable bearings for free-rotation thereof. Each carriage roller means has a pair of flange portions 46 which are parallel to one another and are spaced approximately the width of the guide rail so that the carriage is properly aligned with and guided by the guide rails.

Referring also to FIGURE 7, two drive motors 47 and 48 are mounted on the bottom of the carriage, one at each end thereof. The motors drive the carriage along the guide tracks 22 and 23. The drive motors 47 and 48 have respective drive shafts 52 and 53 and respective drive pulleys 50 and 55 mounted on the end of the shafts.

Pulley cables 49 and 51 are wrapped around their respective drive motor pulley with one end thereof connected to the inner side and at the end of their respective forward track arms 26 and 27 and the other end thereof connected to the inner side and at the end of their respective back track arms 28 and 29. Therefore, rotation of the drive motor shafts 52 and 53 simultaneously pulls the carriage along the guide tracks in a desired direction.

A pair of eye hooks or other suitable cable mounting means are suitably connected to each central carriage arm 33 and 34. Attached to these eye hooks are two pairs of cables 54 and 56 which have their other ends suitably mounted to two pairs of winches 57 and 58, respectively. The two pairs of winches 57 and 58 are suitably mounted to extendible spreader bars 59 and 61, respectively. The spreader bars are utilized to evenly raise and lower a preconstructed house unit as will be described in more detail hereinafter. It is of course understood, that the eye hooks may be stationary or movably connected to the carriage as well as other suitable lift means being used instead of winches, in accordance to what is desired by the artisan.

The winches 57 and 58 are synchronized to operate simultaneously, as are the motors 47 and 48. The winches with their respective cables 54 and 56 are utilized to raise and lower the spreader bars 59 and 61. The winches are operated by a hand control panel 62 which is operatively connected to a generator 63 and main electrical cable 64 by suitable electrical cable means 66. The electrical cable 66 and cable 64 are multi-wire cables. The wires are suitably electrically connected to the means they are to operate.

The cable 64 is supplied with four automatic cable reels 67, 68, 69 and 71. The automatic reel 67 is positioned adjacent the generator, which is preferably mounted on the gooseneck, so as to allow the electrical cable to be extended as the carriage moves over a house foundation as is illustrated in FIGURE 4, and to be wound tightly when the carriage is over the trailer bed, as is illustrated in FIG. 3. The automatic cable reel 68 allows the cable to always be in a taut position whether the carriage is in its contracted position, as illustrated in FIGURE 1, or in its extended position, as is illustrated in FIGURES 3 and 4. The cable reels 69 and 71 are utilized to maintain the winch electrical wires 72 in a taut position regardless of whether the winches are adjacent the undersurface of the carriage or are spaced substantially therefrom.

Therefore, it is seen that electrical current supplied by the generator, which may be operated by the truck cab motor, or by a battery means supplies current to operate the drive motors 47 and 48 simultaneously, the winches 57 and 58 simultaneously, and to drive both the drive motors and the winches simultaneously if desired.

It is of course understood that the winches may be connected to the bottom of the carriage and their cables connected to the spreader bars and also, that other suitable means for raising and lowering the spreader bars and moving the carriage may be utilized if desired. The apparatus as shown in the present application is merely for illustrative purposes and is only the preferred embodiment of the applicants' house unit trailer.

The ends of the trailer bed are provided with hollow enlarged rectangular portions 76 and 77. The front rectangular portions 76 has contained therein stabilizing arms 78 and 79 that extend from each end thereof and have hydraulic jacks 81 (FIG. 5) connected to the ends thereof. The stabilizing arms retract with their respective end portion and extend outwardly perpendicular to the unloading side of the trailer and also loading side of the trailer. The stabilizing arms are utilized to place the trailer during unloading on a substantially horizontal plane as well as to stabilize the trailer during the unloading thereof and to compensate for any unevenness of the ground the trailer is on.

Referring to FIGURES 4 and 5, the trailer bed 13 has a pair of spaced longitudinally extending parallel side channels 86 and 87 extending from the rear toward the front of the trailer bed. Slidably mounted between the side channels 86 and 87 is a central core 88 connected to the front end of the trailer bed and extending toward the rear of the trailer. The central core is made up of a plurality of interconnected beams 85. The side channels have a metal covering 90 thereover.

A plurality of side channel outrigger supports 89 and 91 are mounted to the side channels 86 and 87, respectively, and extend substantially perpendicularly away therefrom. The outrigger supports 89 and 91 have telescopic arms 92 and 94 respectively connected thereto and the ends of the telescopic arms 92 and 94 have fastened thereto outrigger side support bars 93 and 96, respectively.

A plurality of core outriggers 97, having telescopic arms 98 extending towards the unloading side of the trailer and telescopic arms 99 extending towards the loading side of the trailer, are slidably mounted across the trailer bed core and extend substantially perpendicularly thereto. The outriggers 89, 91 and 97 are used to support the entire width of a preconstructed house unit and can accommodate house units of varying widths. Likewise, the core is slidable within the channels 87 and 86 to provide a means for lengthening the trailer bed to accommodate house units of varying lengths. Suitable means (not shown) are utilized for extending the trailer bed and for locking the trailer bed in its extended position.

In operation, the house unit trailer 11 having a preconstructed house unit thereon is driven along side a constructed house foundation 101. The trailer is spaced from the outside walls of the house foundation. Mounted to one pair of spaced parallel house foundation end walls near the front and rear of each wall is a foundation beam support 102, as is illustrated in FIGURES 5 and 6, a flat top support surface 102a and a bottom stepped portion with a foundation engaging portion 102b and a shoulder portion 102c. The length of the foundation engaging portion is longer than the width of the foundation wall and has a thickness preferably less than foundation slots 100.

The foundation beam supports 102 have means 103 for connecting the beam supports to the inner surface of the end walls while the shoulder portion 102c thereof engages the outer surface of the end walls. Beam support jacks 104 are connected to the underside of the supports 102 and the ground adjacent the end walls to additionally help maintain the beams support top surfaces 102a on a substantially horizontal plane, during the unloading of the house unit onto the foundation.

The trailer stabilizing arms 78, 79, 83 and 84 are extended from their respective ends and their jacks 81 are adjusted to levelize the trailer. For unloading the preconstructed house unit 106, shown in dotted lines in FIGURES 5 and 6, the jacks 81 on the stabilizing arms 79 and 84 are preferably adjusted so that the trailer tips slightly towards the house foundation. The reason for this slight tip will become more apparent hereinafter.

The hydraulic lifts 16 and 17 are actuated to raise the trailer tracks 22 and 23 and the carriage 32 a predetermined distance above the house foundation.

The winches 57 and 58 are actuated and the spreader bars are raised over the preconstructed house unit. The winch cables 54 and 56 may be connected to eye hooks on trolleys which are located inside the core of the carriage. These trolleys inside the core of the carriage enable exact positioning of the spreader bars. The spreader bars 59 and 61 are then aligned and connected with two pairs of spaced lift rods 107 and 108 respectively. The lift rods extend through the preconstructed house unit and are attached to the inside side wall near the corners thereof. The lift rods have a top portion extending through the top of the house unit and hooked onto the bottom of the spreader bars by hooks 60 attached adjacent the end portion thereof. The other end of the lift rod is suitably connected to the bottom of the house unit by snatch blocks 105. The snatch blocks removably mount the lift rods to the house unit and the lift rods are preferably mounted in the house unit at the factory. The lift rods are positioned approximately near the four corners of the house unit to maintain continuous and even support of the house unit during unloading thereof and thereby eliminating undue stresses and strains on its structural beams.

The forward unloading track arms 26 and 27 are ready to be swung to open position aside the foundation end walls. Locking means (not shown), are removed or unlocked from the forward track arms. The locking means may be a pin and aperture type of locking means, means that is to be removed in order to unlock the track arms or other suitable means that can be locked and unlocked as desired. The locking means prevent the forward and back track arms from opening during travel of the trailer.

As previously described, the trailer is pitched towards the foundation 101. When the locking means on the forward unloading track arms are unlocked, the weight of the track arms will swing themselves into substantially open position. Once in the open position, the locking means are reinserted or relocked to lock the track arms 26 and 27 in open position substantially parallel with one another and aligned with the central track arms 24 and 25 respectively, as is illustrated in FIGURES 5 and 6. The hydraulic strut supports 30 and 31 are unhooked from the strut clamps 30b and 31b on the bottom of the guide rails and the strut supports lowered. The hydraulic struts are secured to the foundation beam support top surface 102 and the track 22 and 23 are levelized and secured as desired.

The winches 57 and 58 are now actuated to raise the preconstructed house unit 106 above the level of the house foundation 101. When a sufficient height is reached, the drive motors 47 and 48 are actuated to move the carriage 32 along the guide tracks over the house foundation. When the carriage and accompanying house unit are over the far end of the foundation, as is illustrated in FIGURE 4, the drive motors are stopped and the winches 57 and 58 actuated to lower the preconstructed house unit on to the foundation wall. When the house unit is on the foundation wall, the life rods 107 and 108 are disconnected from the spreader bars and the spreader bars and carriage are returned to the trailer bed. One section of the sectional house is now positioned on the foundation wall. During the unloading of this one section 106 on the foundation wall another ordinary low bed trailer with the second house unit of a two sectional house was pulled along side the loading side of the trailer 11. The back track arms 28 and 29 were raised and the supporting struts 31' were lowered to levelize the back guide track arms. The back track arms extended over the low bed trailer so that the carriage 32 can be positioned over the second house unit thereon. The second house unit also has lift bars that were mounted therein and when the carriage is brought over the back track arms, the lift bars are connected to the spreader bars. The winches on the spreader bars then may be actuated to lift second house unit off the low bed trailer and the drive motors actuated to move the carriage and second house unit over the house unit trailer bed and over the house foundation to be united with the house unit already on the house foundation.

The use of spreader bars and the lift bars have many advantages in the unloading of the preconstructed house unit by the house unit trailer of the present invention. By utilizing lift bars and spreader bars it is possible to fully support the house unit without placing undue strain on the house foundation, which would occur for instance by pushing the house foundation over rollers, and also, it is possible to afford tilting and slight movement of the house foundation for swiftly and correctly positioning said house unit on the foundation.

It is further understood that equivalent mechanisms for raising and lowering the house unit and moving the house unit over the house foundation are intended by the applicants. The embodiment shown in the present application is merely the applicants' preferred embodiment for providing a house unit trailer with the necessary weight and dimensional characteristics for transporting and unloading a preconstructed house unit onto a house foundation.

After the second house unit is mounted on the house foundation in position with the first preconstructed house unit and the two-sectional house is formed, the trailer 11 is then placed back in position for transporting and erecting another sectional house. The hydraulic struts 30 and 31 are removed from the foundation beam supports 102 and pivoted and fastened by suitable strut clamp means to the forward unloading guide track arms 26 and 27'. In order to facilitate the pivoting of the forward track arms 26 and 27 adjacent to the carriage, it may be desired to lower the rear jacks 81 on the stabilizing arms 79 and 84 so that the trailer tilts away from the house foundation 102. In this manner the weight of the unloading arms 26 and 27 carry themselves in a swinging motion. Of course before the extension arms are swung into their collapsed position, their locking means are unlocked and not locked again until they are in their closed position. Likewise, the back track arms are collapsed and their hydraulic strut supports are suitably fastened to the trailer means. The trailer bed and the carriage are retracted so that they are not in their extended position, as is illustrated in FIGURES 5 and 6, and likewise, the stabilizing arms and outrigger supports are in their retracted position. In this manner, the trailer is able to return to the factory in its most compact position.

It is seen where the applicants have provided a trailer which is capable of transporting a preconstructed house unit and effectively unloading a preconstructed house unit on to a house foundation to form a sectional house. The applicants' trailer forms a sectional house in an improved manner which reduces the building time and substantially the cost of erecting sectional houses.

It is of course understood that the embodiment of the invention has been used for illustrative purposes only, and that modifications and variations in the present invention may be affected without departing from the spirit and scope of the novel concept thereof and it will be understood that this application is limited only by the scope of the appended claims.

We claim as our invention:

1. A house unit trailer for transporting and unloading house units comprising
   a house unit trailer bed,
   said trailer bed having a front end, a rear end, an unloading side, and a loading side,
   said trailer bed having means to lengthen said trailer bed to accommodate house units of various lengths,
   a plurality of outrigger supports mounted on said trailer bed,
   said outrigger supports having telescopic arms that extend outwardly and perpendicularly to both sides of the trailer bed to thereby support the complete width of house units having various widths,
   rear hydraulic lifts mounted on the trailer bed at the rear thereof,
   front hydraulic lifts mounted on the trailer bed at the front thereof,
   means to operate said front and rear pair of hydraulic lifts simultaneously,
   a rear guide rail connected to said rear hydraulic lifts so as to be raised and lowered thereby,
   a front guide rail connected to front hydraulic lifts so as to be raised and lowered thereby,
   said front and rear guide rails being adapted to extend parallel to each other when in loading and unloading position,
   a house unit carriage extending substantially the length of the trailer bed between the front and rear hydraulic lifts and having a telescopic length to accommodate various trailer bed lengths,
   guide means being supported on said front and rear guide rails and connected to said carriage to guide the carriage along said guide rails,
   motor means drivingly connected to said carriage whereby actuation of said motor means moves the carriage along the guide rails in a desired direction, and
   lift means connecting said carriage to a house unit to raise and lower said house unit
   whereby the house unit on the trailer bed may be raised off the trailer bed and guided and carried over the house foundation by a house unit carriage guided over the house foundation by the parallel unloading guide rail arms and then lowered into position on said house foundation.

2. A house unit trailer for transporting and unloading house units comprising
   a house unit trailer bed,
   said trailer bed having a front end, a rear end, an unloading side, and a loading side,
   said trailer bed having means to lengthen said trailer bed to accommodate house units of various lengths,
   a plurality of outrigger supports mounted on said trailer bed,
   said outrigger supports having telescopic arms that extend outwardly and perpendicularly to both sides of the trailer bed to thereby support the complete width of house units having various widths,
   a rear hydraulic lift mounted on the trailer bed at the rear thereof,
   a front hydraulic lift mounted on the trailer bed at the front thereof,
   a rear guide rail connected to said rear hydraulic lift so as to be raised and lowered thereby,
   a front guide rail connected to said front hydraulic lift so as to be raised and lowered thereby,
   said rear and front guide rails each having a forward unloading arm capable of extending over a house foundation positioned adjacent and spaced from the trailer bed,
   a hydraulic stabilizing jack pivotally mounted to each unloading guide rail arm and being adapted to support said unloading guide arms a predetermined distance above the house foundation, a house unit carrige having a telescopic length to accommodate various trailer bed lengths,
said carriage extending between said guide rails and movingly supported thereon,
motor means drivingly connected to said carriage whereby actuation of said motors moves the carriage along the guide rail in a desired direction,
a spreader bar,
said spreader bar having a lift means connected thereto,
said spreader bar lift means being connected to the carriage to raise and lower said spreader bar with respect to said carriage, and
means on said spreader bar to mount a house unit to lift said house unit therewith
whereby the house unit on the trailer bed may be raised off the trailer bed and guided and carried over the house foundation by a house unit carriage guided over the house foundation by the parallel unloading guide rail arms and then lowered into position on said house foundation.

3. A house unit trailer for transporting and unloading house units comprising
a house unit trailer bed,
said trailer bed having a front end, a rear end, an unloading side, and a loading side,
said trailer bed having means to telescopically lengthen said trailer bed to accommodate house units of various lengths,
a plurality of outrigger supports mounted on said trailer bed,
said outrigger supports having telescopic arms that extend outwardly and perpendicularly to both sides of the trailer bed to thereby support the complete width of house units having various widths,
a rear hydraulic lift mounted on the trailer bed at the rear thereof,
a front hydraulic lift mounted on the trailer bed at the front thereof,
said front and rear of hydraulic lifts having telescopic arms that are operated simultaneously,
a rear guide rail mounted on said rear hydraulic lifts so as to be raised and lowered thereby,
a front guide rail mounted on said front hydraulic lifts so as to be raised and lowered thereby,
said rear and front guide rails each having a forward unloading arm capable of extending over a house foundation positioned adjacent and spaced from the trailer bed, a stationary arm, and a back loading arm,
said forward unloading arm being pivotally mounted to one end of the stationary arm,
said back loading arm being pivotally mounted to the other end of the stationary arm,
said front and rear guide rails being adapted to extend parallel to the trailer bed and to each other when in loading and unloading position,
a pair of hydraulic stabilizing jacks pivotally mounted to the underside of each unloading guide rail arm being adapted to support said unloading guide arms a predetermined distance above a house foundation,
a telescopic house unit carriage having a telescopic length to accommodate various trailer bed lengths,
freely rotating guide rollers extending from both ends of said carriage,
said guide rollers being supported on said front and rear guide rails to guide the carriage along said guide rails,
motor means drivingly connected to said carriage whereby actuation of said motors moves the carriage along the guide rail in a desired direction,
a spreader bar,
said spreader bar having a winch means connected thereto,
said winch means having winch cables connected to the carriage to raise and lower said spreader bar with respect to said carriage,
means to actuate said winch whereby said spreader bar may be raised and lowered, and
means on said spreader bar to mount a house unit to lift said house unit therewith,
whereby the house unit on the trailer bed may be raised off the trailer bed and guided and carried over the house foundation by a house unit carriage guided over the house foundation by the parallel unloading guide rail arms and then lowered into position on said house foundation.

4. A house unit trailer for transporting and unloading house units comprising
a house unit trailer bed having means to connect a truck cab thereto,
said trailer bed having a front end, a rear end, an unloading side, and a loading side,
stabilizing arm telescopically mounted in said front and rear ends so as to extend outwardly and perpendicular to both the trailer bed sides at both ends thereof,
said stabilizing arms having lifts on the ends thereof to raise the trailer bed and levelize as well as stabilize said trailer bed,
said trailer bed having means to telescopically lengthen said trailer bed to accommodate house units of various lengths,
a plurality of outrigger supports mounted on said trailer bed,
said outrigger supports having telescopic arms that extend outwardly and perpendicularly to both sides of the trailer bed to thereby support the complete width of house units having various widths,
a rear pair of interconnected upwardly extending hydraulic lifts mounted on the trailer bed at the rear thereof,
a front pair of interconnected upwardly extending hydraulic lifts mounted on the trailer bed at the front thereof,
said front and rear pair of hydraulic lifts having telescopic arms that are operated simultaneously,
a rear guide rail mounted on top of said rear hydraulic lifts so as to be raised and lowered thereby,
a front guide rail mounted on top of said front hydraulic lifts so as to be raised and lowered thereby,
said rear and front guide rails each having a forward unloading arm, a stationary arm, and a back loading arm,
said forward unloading arm being pivotally mounted to one end of the stationary arm to pivot in a plane substantially parallel to the plane of the trailer bed,
said back loading arm being pivotally mounted to the other end of the stationary arm to pivot in a plane substantially perpendicular to the plane of the trailer bed,
said front and rear guide rails being adapted to extend parallel to the trailer bed and to each other when in loading and unloading position,
a pair of hydraulic stabilizing jacks pivotally mounted to the underside of each unloading guide rail arm being storage mountable thereon and adapted to support said unloading guide arms a predetermined distance above a house foundation,
a telescopic house unit carriage having a telescopic length to accommodate various trailer bed lengths,
freely rotating guide rollers extending from both ends of said carriage,
said guide rollers being supported on said front and rear guide rails to guide the carriage along said guide rails,
motor means having a rotating shaft with a pulley on the end of the shaft being mounted on each end of said carriage,
a cable drivingly wrapped around each motor pulley and having one end thereof connected to the end of the unloading guide rail arm and the other end thereof connected to the end of the loading guide rail arm whereby actuation of said motors moves the carriage along the guide rail in a desired direction, means to simultaneously actuate said carriage motor means, a pair of spreader bars, each spreader bar having a pair of winches connected thereto, said winches having winch cables connected to the carriage to raise and lower said spreader bars with respect to said carriage, means to actuate said winches whereby said spreader bars may be raised and lowered simultaneously, and means on each of said spreader bars to mount a pair of house unit lift bars that are mounted in one end of a house unit to raise and lower the house unit therewith whereby the house unit on the trailer bed may be raised off the trailer bed and guided and carried over the house foundation by a house unit carriage guided over the house foundation by the parallel unloading guide rail arms and then lowered into position on said house foundation.

5. A trailer for transporting and placing prefrabricated house units on their foundations comprising:

a wheel mounted trailer bed having a hitch at the forward end thereof for connection with a tractor and having parallel sides, lifts at the front and rear ends of the trailer bed extending vertically therefrom, bracing means for said lifts retaining said lifts at the front and rear ends of the trailer bed from weaving movement with respect to each other, said trailer bed being extensible longitudinally and laterally to carry house units of various lengths and widths between the front and rear lifts, parallel generally horizontally extending guide tracks mounted on the tops of said lifts and extensible beyond one side of said trailer bed and positionable over a foundation by movement of said trailer bed along the ground, a carriage means extending between and having its ends movably supported on said guide tracks, said carriage means being extensible to adjust to various trailer bed lengths, lift means carried by said carriage means and extending downwardly therefrom for connection with a house unit to lift a house unit above said trailer bed, power means for moving said carriage means along said guide tracks, ground engaging stabilizing supports for the front and rear ends of said trailer bed for holding said trailer bed in fixed relation with respect to the ground, and outboard support means for the outer ends of said guide tracks, supporting said guide tracks in fixed vertically spaced relation with respect to a foundation.

6. A trailer for transporting and placing prefabricated house units on their foundations comprising:

a wheel mounted trailer bed having a hitch at the forward end thereof for connection with a tractor and having parallel sides, lifts at the front and rear ends of the trailler bed extending vertically therefrom, bracing means for said lifts retaining said lifts at the front and rear ends of the trailer bed from weaving movement with respect to each other, parallel generally horizontally extending guide tracks mounted on said lifts and extensible beyond one side of said trailer bed and positionable over a foundation by movement of said trailer bed along the ground, said guide tracks having central guide arms and forward guide arms, said central guide arms being attached to the front and rear lifts to be raised and lowered thereby, said forward guide arms being extensibly connected to one end of said central guide arms to extend generally parallel and horizontally beyond one side of the trailer bed and over a house foundation, a carriage means extending between and having its ends movably supported on said guide tracks, lift means carried by said carriage means and extending downwardly therefrom for connection with a house unit to lift a house unit above said trailer bed, power means for moving said carriage means along said guide track central and forward arms, ground engaging stabilizing supports for the front and rear ends of said trailer bed for holding said trailer bed in fixed relation with respect to the ground, and outboard support means for the outer ends of said guide tracks, supporting said guide tracks in fixed vertically spaced relation with respect to a foundation.

7. A trailer for transporting and placing prefabricated house units on their foundations comprising:

a wheel mounted trailer bed having a hitch at the forward end thereof for connection with a tractor and having parallel sides, lifts at the front and rear ends of the trailer bed extending vertically therefrom, bracing means for said lifts retaining said lifts at the front and rear ends of the trailer bed from weaving movement with respect to each other, parallel generally horizontally extending guide tracks mounted on the tops of said lifts and extensible beyond one side of said trailer bed and positionable over a foundation by movement of said trailer bed along the ground, said guide tracks having central guide arms, back guide arms, and forward guide arms, said central guide arms being attached to the front and rear lifts to be raised and lowered thereby, said forward guide arms being extensibly connected to one end of said central guide arms to extend generally parallel and horizontally beyond one side of the trailer bed and over a house foundation, said rear guide arms being extensibly connected to the other end of said central guide arms to extend generally parallel and horizontally beyond the other side of the trailer bed, a carriage means extending between and having its ends movably supported on said guide tracks, lift means carried by said carriage means and extending downwardly therefrom for connection with a house unit to lift a house unit above said trailer bed, power means for moving said carriage means along said guide track arms, ground engaging stabilizing supports for the front and rear ends of said trailer bed for holding said trailer bed in fixed relation with respect to the ground, and outboard support means for the outer ends of said guide track forward and back arms supporting said guide track forward and back arms in fixed vertically spaced relation with respect to the trailer bed.

8. A trailer for transporting and placing prefabricated house units on their foundations comprising:

a wheel mounted trailer bed having a hitch at the forward end thereof for connection with a tractor and having parallel sides, lifts at the front and rear ends of the trailer bed extending vertically therefrom, bracing means for said lifts retaining said lifts at the front and rear ends of the trailer bed from weaving movement with respect to each other, parallel generally horizontally extending guide tracks mounted on the tops of said lifts and extensible beyond one side of said trailer bed and positionable over a foundation by movement of said trailer bed along the ground, said guide tracks having central guide arms, back guide arms, and forward guide arms, said central guide arms being attached to the front and rear lifts to be raised and lowered thereby, said forward guide arms being generally pivotally mounted to one end of said central guide arm to extend generally parallel and horizontally beyond one side of the trailer bed and over a house foundation, said back guide arms being generally pivotally mounted to the other end of said central guide arms for extending generally parallel and horizontally beyond the other side of the trailer bed and over a loading means, a carriage means extending between having its ends movably supported on said guide tracks, lift means carried by said carriage means and extending downwardly therefrom for connection with a house unit to lift a house unit above said trailer bed, power means for moving said carriage means along said guide track arms, ground engaging stabilizing supports for the front and rear ends of said trailer bed for holding said trailer bed in fixed relation with respect to the ground, and outboard support means for the outer ends of said guide track forward and back arms supporting said guide track arms in fixed vertically spaced relation with respect to the trailer bed.

9. A trailer for transporting and placing prefabricated house units on their foundations comprising:

a wheel mounted trailer bed having a hitch at the forward end thereof for connection with a tractor and having parallel sides, lifts at the front and rear ends of the trailer bed extending vertically therefrom, bracing means for said lifts retaining said lifts at the front and rear ends of the trailer bed from weaving movement with respect to each other, parallel generally horizontally extending guide tracks mounted on the tops of said lifts and extensible beyond one side of said trailer bed and positionable over a foundation by movement of said trailer bed along the ground, said guide tracks having central guide arms, back guide arms, and forward guide arms, said central guide arms being attached to the front and rear lifts to be raised and lowered thereby, said forward guide arms being generally horizontally pivotally mounted to one end of said central guide arms for extending generally parallel to each other and generally horizontally beyond one side of the trailer bed and over a house foundation, said back guide arms being generally vertically pivotally mounted to the other end of said central guide arms for extending generally parallel to each other and generally horizontally beyond the other side of the trailer bed and over a loading means, a carriage means extending between and having its ends movably supported on said guide tracks, lift means carried by said carriage means and extending downwardly therefrom for connection with a house unit to lift a house unit above said trailer bed, power means for moving said carriage means along said guide tracks, ground engaging stabilizing supports for the front and rear ends of said trailer bed for holding said trailer bed in fixed relation with respect to the ground, and outboard support means for the outer ends of said guide track forward and back arms for supporting said guide track forward and back arms in fixed vertically spaced relation with respect to the trailer bed.

10. A trailer for transporting and placing prefabricated house units on their foundations comprising:

a wheel mounted trailer bed having a hitch at the forward end thereof for connection with a tractor and having parallel sides, lifts at the front and rear ends of the trailer bed extending vertically therefrom, bracing means for said lifts retaining said lifts at the front and rear ends of the trailer bed from weaving movement with respect to each other, said trailer bed being extensible longitudinally and laterally to carry house units of various lengths and widths between the front and rear lifts, parallel generally horizontally extending guide tracks mounted on the tops of said lifts and extensible beyond one side of said trailer bed and positionable over a foundation by movement of said trailer bed along the ground, a carriage means extending between and having its ends movably supported on said guide tracks, said carriage means being extensible to adjust to various trailer bed lengths, said guide tracks having central guide arms and forward guide arms, said central guide arms being attached to the front and rear lifts to be raised and lowered thereby, said forward guide arms being extensibly connected to one end of said central guide arms to extend generally parallel and horizontally beyond one side of the trailer bed and over a house foundation, lift means carried by said carriage means and extending downwardly therefrom for connection with a house unit to lift a house unit above said trailer bed, power means for moving said carriage means along said guide tracks, ground engaging stabilizing supports for the front and rear ends of said trailer bed for holding said trailer bed in fixed relation with respect to the ground, and outboard support means for the outer ends of said guide tracks for supporting said guide tracks in fixed vertically spaced relation with respect to a foundation.

11. A trailer for transporting and placing prefabricated house units on their foundations comprising:

a wheel mounted trailer bed having a hitch at the forward end thereof for connection with a tractor and having parallel sides, lifts at the front and rear ends of the trailer bed extending vertically therefrom, bracing means for said lifts retaining said lifts at the front and rear ends of the trailer bed from weaving movement with respect to each other, said trailer bed being extensible longitudinally and laterally to carry house units of various lengths and widths between the front and rear lifts, parallel generally horizontally extending guide tracks mounted on the tops of said lifts and extensible beyond one side of said trailer bed and positionable over a foundation by movement of said trailer bed along the ground, a carriage means extending between and having its ends movably supported on said guide tracks, said carriage means being extensible to adjust to various trailer bed lengths, said guide tracks having central guide arms, back guide arms, and forward guide arms, said central guide arms being attached to the front and rear lifts to be raised and lowered thereby, said forward guide arms being generally pivotally mounted to one end of said central guide arms to extend generally parallel and horizontally beyond one side of the trailer bed and over a house foundation, said back guide arms being generally pivotally mounted to the other end of said central guide arms extending generally parallel and horizontally beyond the other side of the trailer bed, and over a loading means, lift means carried by said carriage means and extending downwardly therefrom for connection with a house unit to lift a house unit above said trailer bed, power means for moving said carriage means along said guide tracks, ground engaging stabilizing supports for the front and rear ends of said trailer bed for holding said trailer bed in fixed relation with respect to the ground, and outboard support means for the outer ends of said guide tracks for supporting said guide tracks in fixed vertically spaced relation with respect to a foundation.

12. A trailer for transporting and placing prefabricated house units on their foundations comprising:

a wheel mounted trailer bed having a hitch at the forward end thereof for connection with a tractor and having parallel sides, lifts at the front and rear ends of the trailer bed extending vertically therefrom, bracing means for said lifts retaining said lifts at the front and rear ends of the trailer bed from weaving movement with respect to each other, said trailer bed being extensible longitudinally and laterally to carry house units of various lengths and widths between the front and rear lifts, parallel generally horizontally extending guide tracks mounted on the tops of said lifts and extensible beyond one side of said trailer bed and positionable over a foundation by movement of said trailer bed along the ground, a carriage means extending between and having its ends movably supported on said guide tracks, said carriage means being extensible to adjust to various trailer bed lengths, said guide tracks having central guide arms and forward guide arms, said central guide arms being attached to the front and rear lifts to be raised and lowered thereby, said forward guide arms being extensibly connected to one end of said central guide arms to extend generally parallel and horizontally beyond one side of the trailer bed and over a house foundation, spreader bar means swingingly connected to said carriage means, connector means attached to said spreader bar to connect a house unit thereto, lift means connected to said spreader bar to lift a house unit above said trailer bed, power means for moving said carriage means along said guide tracks, ground engaging stabilizing supports for the front and rear ends of said trailer bed for holding said trailer bed in fixed relation with respect to the ground, and outboard support means for the outer ends of said guide tracks for supporting said guide tracks in fixed vertically spaced relation with respect to a foundation.

13. A trailer for transporting and placing prefabricated house units on their foundations comprising:

a wheel mounted trailer bed having a hitch at the forward end thereof for connection with a tractor and having parallel sides, lifts at the front and rear ends of the trailer bed extending vertically therefrom, bracing means for said lifts retaining said lifts at the front and rear ends of the trailer bed from weaving movement with respect to each other, said trailer bed being extensible longitudinally and laterally to carry house units of various lengths and widths between the front and rear lifts, a plurality of outriggers forming the means to laterally extend said trailer bed, said outriggers being attached to said trailer bed and having extensible arms that extend outwardly from the sides of the trailer bed to support house units of various widths, parallel generally horizontally extending guide tracks mounted on the tops of said lifts and extensible beyond one side of said trailer bed and positionable over a foundation by movement of said trailer bed along the ground, a carriage extending between and having its ends movably supported on said guide tracks, said carriage being extensible to adjust to various trailer bed lengths, said guide tracks having central guide arms, back guide arms, and forward guide arms, said central guide arms being attached to the front and rear lifts to be raised and lowered thereby, said forward guide arms being generally horizontally pivotally mounted to one end of said central guide arms for extending generally parallel to each other and generally horizontally beyond one side of the trailer bed and over a house foundation, said back guide arms being generally vertically pivotally mounted to the other end of said central guide arms for extending generally parallel to each other and generally horizontally beyond the other side of the trailer bed and over a loading means, a pair of spreader bars extending transversely with respect to said trailer bed, a pair of spreader bar winches for each spreader bar, cable means interconnecting the winches with the spreader bars and the carriage to move the spreader bars vertically with respect to the carriage, connector means connected to said spreader bars to attach a house unit thereto and thereby raise and lower the house unit with respect to the trailer bed, lift means carried by said carriage and extending downwardly therefrom for connection with a house unit to lift a house unit above said trailer bed, power means for moving said carriage along said guide tracks, ground engaging stabilizing supports for the front and rear ends of said trailer bed for holding said trailer bed in fixed relation with respect to the ground, and outboard support means pivotally connected to the outer ends of said guide tracks for supporting said guide tracks in fixed vertically spaced relation with respect to a foundation.

14. A trailer for transporting and placing prefabricated house units on their foundations comprising:

a wheel mounted trailer bed, lifts at the front and rear ends of the trailer bed extending substantially vertically therefrom, bracing means for said lifts retaining said lifts at the front and rear ends of the trailer bed from weaving movement with respect to each other, parallel generally horizontally extending guide tracks mounted on said lifts and extensible beyond one side of said trailer bed and positionable over the foundation by movement of said trailer bed along the ground, said guide tracks having central guide arms and forward guide arms, said central guide arms being attached to the front and rear lifts to be raised and lowered thereby, said forward guide arms being extensibly connected to one end of said central guide arms to extend generally parallel and horizontally beyond one side of the trailer bed and over a house foundation, a carriage means extending between and having its ends movably supported on said guide tracks, lift means carried by said carriage means and extending downwardly therefrom for connection with a house unit to lift a house unit above said trailer bed, power means for moving said carriage means along said guide track central and forward arms, and outboard support means for the outer ends of said guide tracks, supporting said guide tracks in fixed vertically spaced relation with respect to a foundation.

(References on following page)

References Cited by the Examiner

UNITED STATES PATENTS

| | | | |
|---|---|---|---|
| 1,437,965 | 12/1922 | Fitch | 214—38.42 |
| 2,547,269 | 4/1951 | Kinsey | 214—390 |
| 2,593,465 | 4/1952 | Le Tourneau | 214—390 |
| 2,751,095 | 7/1956 | Hoverstick. | |
| 2,772,004 | 11/1956 | Noble | 212—71 |
| 2,799,403 | 7/1957 | Friedman | 212—15 X |
| 2,984,367 | 5/1961 | McIntyre | 214—15 |
| 3,021,155 | 2/1962 | Sherman | 280—34 X |
| 3,024,931 | 3/1962 | Grover | 214—390 X |
| 3,034,659 | 5/1962 | Willison | 214—15 X |
| 3,052,365 | 9/1962 | Cameron. | |

FOREIGN PATENTS 500,942   11/1954   Italy.

GERALD M. FORLENZA, *Primary Examiner.*

MORRIS TEMIN, HUGO O. SCHULZ, *Examiners.*